United States Patent
Tseng et al.

(10) Patent No.: US 11,611,303 B2
(45) Date of Patent: Mar. 21, 2023

(54) METHOD OF DETECTING CONNECTION FAULT OF ELECTRIC MOTOR

(71) Applicant: DELTA ELECTRONICS, INC., Taoyuan (TW)

(72) Inventors: Shao-Kai Tseng, Taoyuan (TW); Sheng-Han Wu, Taoyuan (TW); Yu-Ling Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/358,678

(22) Filed: Jun. 25, 2021

(65) Prior Publication Data
US 2022/0069752 A1 Mar. 3, 2022

(30) Foreign Application Priority Data
Aug. 28, 2020 (CN) .......................... 202010885413.8

(51) Int. Cl.
*H02P 21/00* (2016.01)
*H02P 21/22* (2016.01)
*H02P 21/18* (2016.01)

(52) U.S. Cl.
CPC .............. *H02P 21/22* (2016.02); *H02P 21/18* (2016.02)

(58) Field of Classification Search
CPC ........... H02P 6/182; H02P 21/18; H02P 21/22
USPC .................................................... 318/400.35
See application file for complete search history.

(56) References Cited

U.S. PATENT DOCUMENTS

| | | | |
|---|---|---|---|
| 9,595,897 B2 * | 3/2017 | Uematsu ................. | H02P 27/08 |
| 10,355,630 B2 | 7/2019 | Tamura et al. | |
| 2011/0089882 A1 * | 4/2011 | Yeh ....................... | G01R 31/343 |
| | | | 180/65.285 |
| 2012/0038304 A1 * | 2/2012 | Yeh ....................... | B60L 3/0061 |
| | | | 318/490 |
| 2014/0062362 A1 * | 3/2014 | Kawai ..................... | H02P 3/22 |
| | | | 318/400.22 |
| 2016/0043673 A1 | 2/2016 | Yamada | |

(Continued)

FOREIGN PATENT DOCUMENTS

| | | |
|---|---|---|
| CN | 107534406 B | 3/2020 |
| JP | 2020005340 A | 1/2020 |
| TW | 201517499 A | 5/2015 |

OTHER PUBLICATIONS

European Search Report dated Nov. 25, 2021 in EP Application No. 21181918.0, 10 pages.

*Primary Examiner* — Erick D Glass
(74) *Attorney, Agent, or Firm* — Muncy, Geissler, Olds & Lowe, P.C.

(57) ABSTRACT

A method of detecting a connection fault of an electric motor, applies to a driving mechanism of an inverter, and includes: measuring a three-phase stator current of the electric motor; transforming the three-phase stator current to acquire dual-axis current components in a stationary coordinate; calculating an angle of rotation of the electric motor according to the dual-axis current components; calculating an angular velocity according to the angle of rotation; comparing a frequency of the angular velocity with a frequency of an output voltage of the inverter; and determining that the electric motor occurs a connection fault if a difference between the frequency of the angular velocity and the frequency of the output voltage is greater than a predetermined frequency difference value.

10 Claims, 6 Drawing Sheets

(56) References Cited

U.S. PATENT DOCUMENTS

| | | | |
|---|---|---|---|
| 2016/0233804 A1 | 8/2016 | Furutani et al. | |
| 2019/0140566 A1 | 5/2019 | Pramod et al. | |
| 2020/0021217 A1* | 1/2020 | Hano | F02D 15/02 |
| 2020/0348207 A1* | 11/2020 | Wang | G01M 13/04 |

* cited by examiner

METHOD OF DETECTING CONNECTION FAULT OF ELECTRIC MOTOR

BACKGROUND

Technical Field

The present disclosure relates to a method of detecting a connection fault of an electric motor, and more particularly to a method of detecting a connection fault of an electric motor by performing calculations in a stationary coordinate.

Description of Related Art

The statements in this section merely provide background information related to the present disclosure and do not necessarily constitute prior art.

Figure 1:
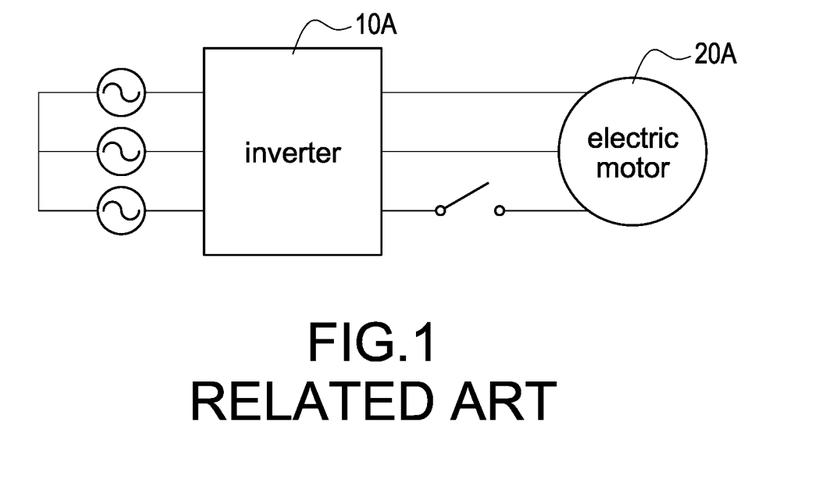
FIG. 1 is a schematic diagram of an open-circuit condition of a three-phase electric motor.

Please refer to FIG. 1, which shows a schematic diagram of an open-circuit condition of a three-phase electric motor. Three output terminals corresponding to three phases (for example, U, V, and W) of an inverter 10A are stably connected to an electric motor 20A so that the electric motor 20A can properly operate according to the output driving of the inverter 10A. However, once the electric motor 20A is open-circuit due to the disconnection of the power line, the output power of the inverter 10A cannot be normally transmitted to the electric motor 20A so that the electric motor 20A cannot be normally operated.

Take the elevator system as an example, when the electric motor 20A is open-circuit, the torque generated by the electric motor 20A cannot be normally outputted. At this condition, it is necessary to immediately detect the connection fault and activate the mechanical brake to stop the movement of the elevator, which can avoid the continuous movement of the elevator in a state that cannot be normally controlled, causing loss of life and property of passengers and damage to the system. In particular, the open-circuit fault and the short-circuit fault of the electric motor 20A are both belong to the connection fault of the electric motor 20A.

SUMMARY

An object of the present disclosure is to provide a method of detecting a connection fault of an electric motor to solve the problems in the related art.

Therefore, the method of detecting the connection fault of the electric motor is applied to an open-loop driving mechanism of an inverter. The method includes: measuring a three-phase stator current of the electric motor; transforming the three-phase stator current to acquire dual-axis current components in a stationary coordinate; calculating an angle of rotation of the electric motor according to the dual-axis current components; calculating an angular velocity according to the angle of rotation; comparing a frequency of the angular velocity with a frequency of an output voltage of the inverter; and determining that the electric motor occurs a connection fault if a difference between the frequency of the angular velocity and the frequency of the output voltage is greater than a predetermined frequency difference value.

In one embodiment, the electric motor is determined to occur the connection fault if the difference between the frequency of the angular velocity and the frequency of the output voltage is greater than the predetermined frequency difference value and the condition lasts for more than a predetermined time.

In one embodiment, the predetermined frequency difference value is 5 Hz.

Accordingly, the method of open-loop motor connection fault detection is disclosed to immediately detect an open-circuit fault or a short-circuit fault so as to avoid the loss of life and property and system damage caused by the continuous operation of the electric motor if the open-circuit fault or the short-circuit fault occurs.

Another object of the present disclosure is to provide a method of detecting a connection fault of an electric motor to solve the problems in the related art.

Therefore, the method of detecting the connection fault of the electric motor is applied to a closed-loop driving mechanism of an inverter. The method includes: measuring a three-phase stator current of the electric motor; transforming the three-phase stator current to acquire a plurality of axis current components in a stationary coordinate; acquiring dual-axis current commands of the inverter in a synchronous coordinate; transforming the dual-axis current commands to acquire a plurality of axis current commands of the inverter in the stationary coordinate; and comparing the plurality of axis current commands in the stationary coordinate and the plurality of axis current components in the stationary coordinate to acquire a plurality of axis current error values in the stationary coordinate, and determining that the electric motor occurs a connection fault if any of the plurality of axis current error values is greater than a predetermined current difference value.

In one embodiment, the plurality of axis current commands are dual-axis current commands or three-axis current commands, the plurality of axis current components are dual-axis current components or the three-phase stator current, and the plurality of axis current error values are dual-axis current error values or three-axis current error values.

In one embodiment, the method further includes: calculating absolute values of the dual-axis current error values or absolute values of the three-axis current error values, and adding the absolute values to acquire a total current error value, and determining that the electric motor occurs the connection fault if the total current error value is greater than a predetermined total current difference value.

In one embodiment, the predetermined total current difference value is 3.5% of a rated output current of the inverter.

In one embodiment, the electric motor is determined to occur the connection fault if the total current error value is greater than the predetermined total current difference value and the condition lasts for more than a predetermined time.

In one embodiment, the predetermined current difference value is 2% of a rated output current of the inverter.

In one embodiment, the electric motor is determined to occur the connection fault if any of the plurality of axis current error values is greater than the predetermined current difference value and the condition lasts for more than a predetermined time.

Accordingly, the method of closed-loop motor connection fault detection is disclosed to immediately detect an open-circuit fault or a short-circuit fault so as to avoid the loss of life and property and system damage caused by the continuous operation of the electric motor if the open-circuit fault or the short-circuit fault occurs.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DESCRIPTION

Reference will now be made to the drawing figures to describe the present disclosure in detail. It will be understood that the drawing figures and exemplified embodiments of present disclosure are not limited to the details thereof.

Take an open-loop control, such as voltage/frequency (V/f) control as an example. Since the open-loop control outputs the corresponding voltage according to only the frequency, and there is no information of the rotor position and current vector, it is not easy to set current threshold values if the connection fault (including an open-circuit fault or a short-circuit fault) detection of an electric motor is performed by only the scalar current difference.

Therefore, in an open-loop driving mechanism of the inverter, the connection fault detection of the electric motor is implemented by comparing a frequency of an angular velocity converted and calculated based on the motor current with a frequency of an output voltage of the inverter. If the frequency difference is less than a predetermined frequency difference value, determining that no connection fault of the multi-phase electric motor occurs. On the contrary, if the frequency difference is greater than the predetermined frequency difference value, determining that the connection fault of the multi-phase electric motor occurs. The multi-phase electric motor may be a three-phase electric motor or a six-phase electric motor. The present disclosure mainly takes the three-phase electric motor as an example, and the detailed description is as follows.

Figure 2:
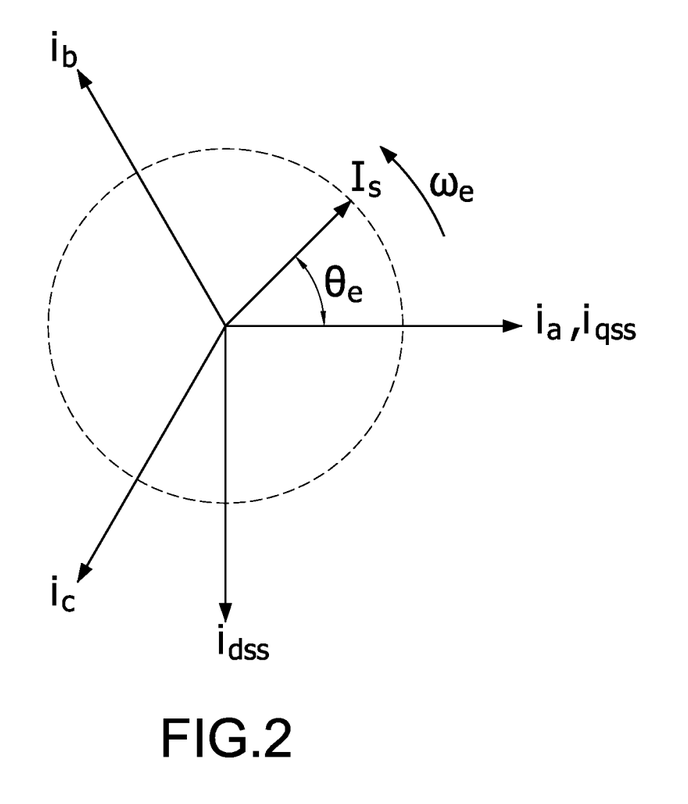
FIG. 2 is a schematic diagram of a three-phase current in a stationary coordinate according to the present disclosure.
Figure 3:
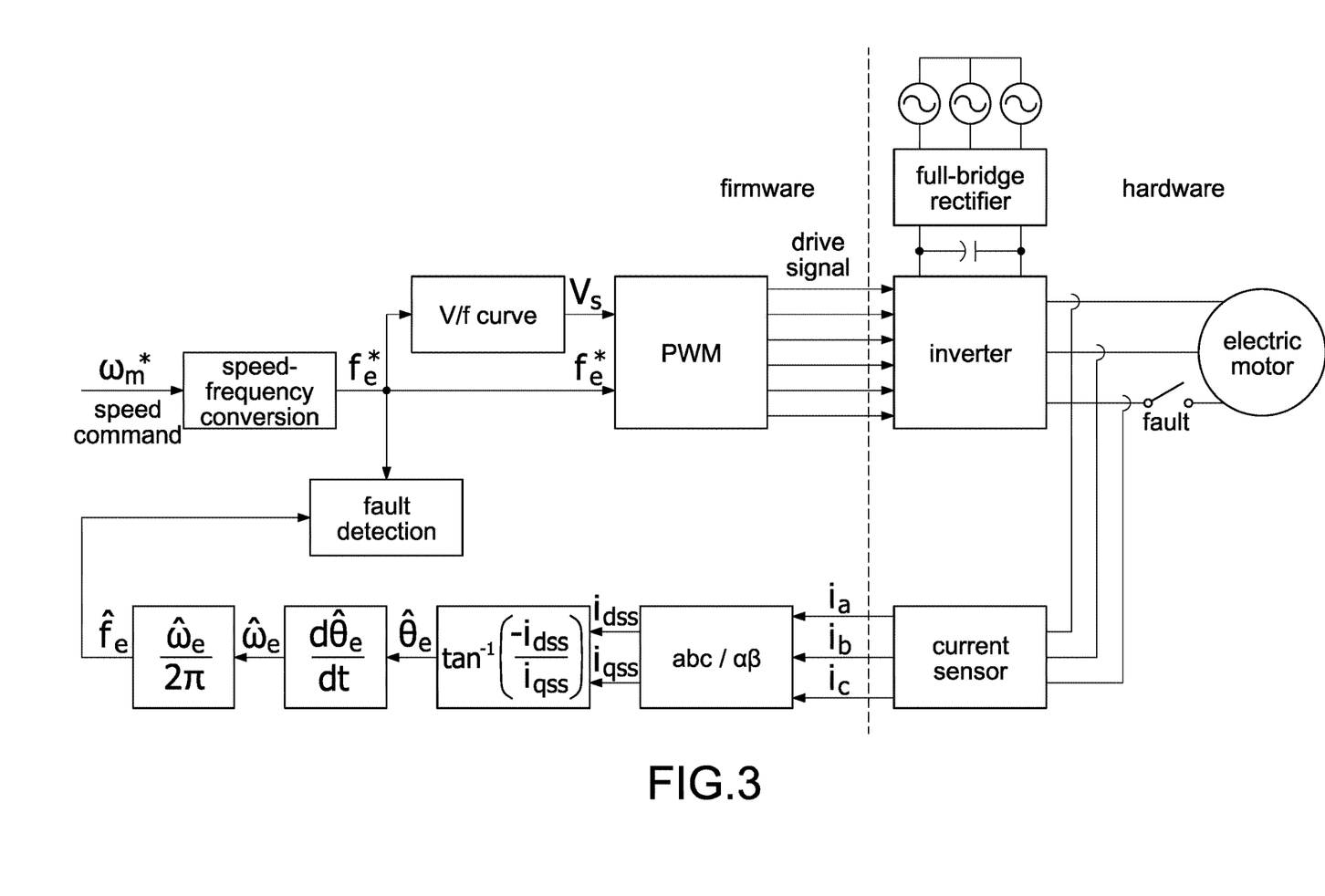
FIG. 3 is a schematic block diagram of connection fault detection of an electric motor according to a first embodiment of the present disclosure.

Please refer to FIG. 2, which shows a schematic diagram of a three-phase current in a stationary coordinate according to the present disclosure. The method of detecting connection fault of the electric motor is applied to an open-loop driving mechanism. In particular, the connection fault may include an open-circuit fault or a short-circuit fault. Please refer to FIG. 3, which shows a schematic block diagram of connection fault detection of an electric motor according to a first embodiment of the present disclosure. Please refer to FIG. 4, which shows a flowchart of a method of detecting connection fault of the electric motor according to a first embodiment of the present disclosure. The following takes the method of FIG. 4 as the main description, and the method is applied to an open-loop driving mechanism. First, a three-phase stator current of an electric motor is measured (S11). In one embodiment, the detection of the open-circuit fault of the three-phase electric motor is used as an example, but it can also be applied to a six-phase electric motor, and it can also be applied to the detection of the short-circuit fault. Afterward, the three-phase stator current is transformed to acquire dual-axis current components in a stationary coordinate (S12). In particular, the stationary coordinate is also called α/β (alpha/beta) coordinate ($i_{qss}$ and $i_{dss}$ are represented as current components). By transformation, the three-phase stator current ($i_a$, $i_b$, $i_c$) can be transformed to the dual-axis current components in the α/β coordinate. That is, a relationship between the stationary coordinate and a scalar stator current is as follows:

$$\begin{bmatrix} i_{qss} \\ i_{dss} \end{bmatrix} = \frac{3}{2} \times I_s \times \begin{bmatrix} \cos \theta_e \\ -\sin \theta_e \end{bmatrix} \quad (1)$$

In which, $I_s$ is the maximum value of the scalar stator current, and $\theta_e$ is the angle between a composite current and a reference axis.

Therefore, the three-phase stator current can be transformed through a relational equation (1) to acquire the dual-axis current components ($i_{qss}$, $i_{dss}$) in the stationary coordinate.

Figure 4:
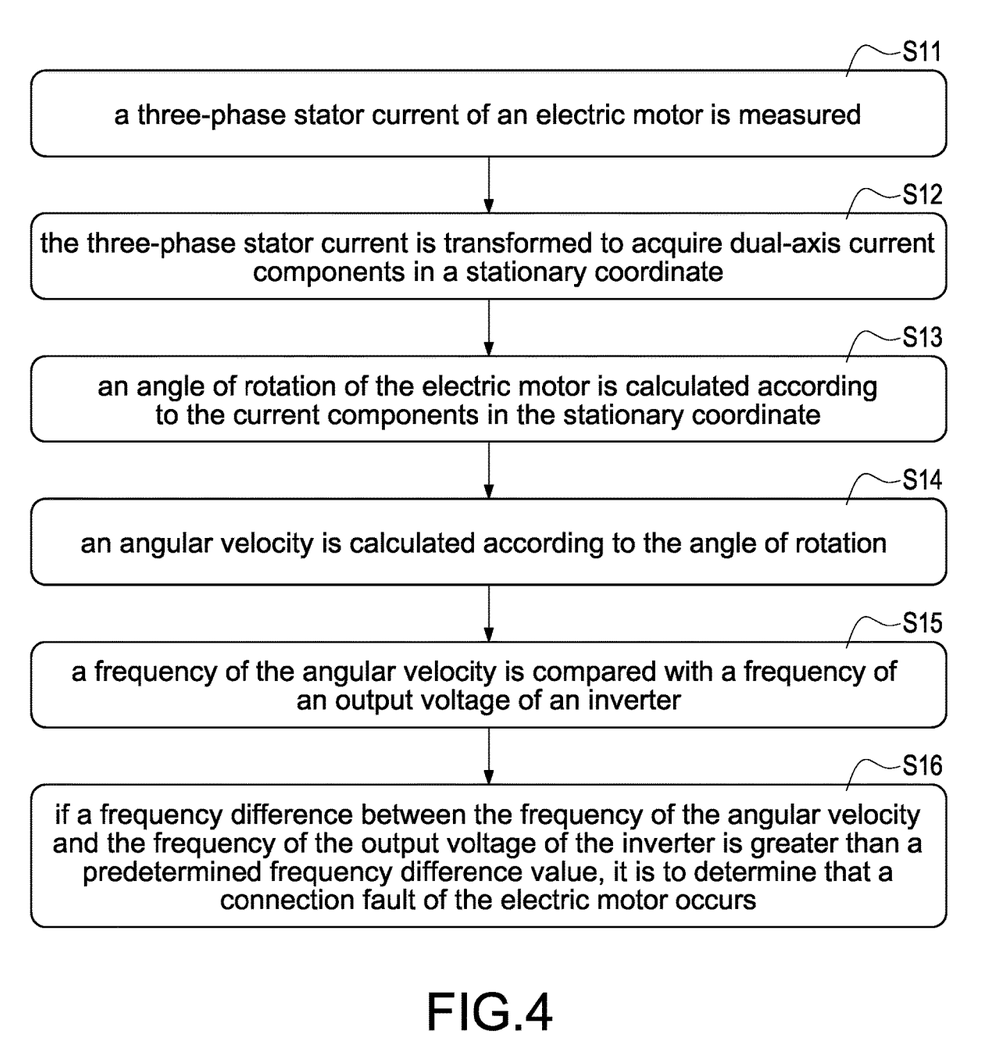
FIG. 4 is a flowchart of a method of detecting connection fault of the electric motor according to a first embodiment of the present disclosure.

Afterward, an angle of rotation of the electric motor is calculated according to the axis current components in the stationary coordinate (S13). In which, a calculated (estimated) value of a vector angle of the stator current is as follows (relational equation (2)):

$$\hat{\theta}_e = \tan^{-1}\left(\frac{-i_{dss}}{i_{qss}}\right) \quad (2)$$

Afterward, an angular velocity is calculated according to the angle of rotation (S14). Specifically, the angular velocity is acquired by differentiating the angle of rotation according to a relational equation (3):

$$\hat{\omega}_e = \frac{d}{dt}\hat{\theta}_e \quad (3)$$

Afterward, a frequency of the angular velocity is compared with a frequency of an output voltage of the inverter (S15). Under the allowable error range, since the angular velocity of the electric motor is converted and calculated from the motor current, the frequency of angular velocity is close to the frequency of the stator current. Therefore, comparing the frequency of the stator current with the frequency of the output voltage of the inverter can be replaced by comparing the frequency of the angular velocity with the frequency of the output voltage of the inverter. In particular, the inverter is used to drive and control the electric motor.

Finally, whether the connection fault of the electric motor occurs can be determined according to the comparison results. Specifically, if a frequency difference between the frequency of the angular velocity and the frequency of the output voltage of the inverter is greater than a predetermined frequency difference value, it is to determine that the connection fault of the electric motor occurs (S16). Since $\hat{\omega}_e = 2\pi \hat{f}_e$, and the frequency $\hat{f}_e$ of the estimated angular velocity basically should be equal to the frequency $f_e$ of the output voltage of the inverter (under ideal conditions without considering errors), the frequency comparison between the frequency of the angular velocity converted and calculated from the stator current and the frequency of the output voltage of the inverter can be implemented. If the frequency difference between the frequency of the angular velocity and the frequency of the output voltage of the inverter is too large, it is to determine that the connection fault of the electric motor occurs. On the contrary, if the frequency difference is less than or equal to the predetermined frequency difference value, it is to determine that the connection fault of the electric motor does not occur. In other words, when the electric motor normally operates (i.e., no open-circuit fault or short-circuit fault occurs), the frequency of angular velocity converted and calculated from the stator current is substantially close to or even the same as the frequency of the output voltage of the inverter. Moreover, since the response of estimating the frequency of the angular velocity by converting and calculating the stator current is fast to instantly follow the frequency of the output voltage of the inverter, the (estimated) frequency of the angular velocity can be used for the connection fault detection of the electric motor.

In one embodiment, the predetermined frequency difference value ($\Delta f$) is, for example but not limited to, 5 Hz. That is, since the frequency of the stator current basically should be equal to the frequency of the output voltage of the inverter under the normal operation of the electric motor, if the frequency difference between the frequency of the angular velocity and the frequency of the output voltage of the inverter is greater than 5 Hz, it is to determine that the connection fault of the electric motor occurs. In particular, the electric motor may be a three-phase electric motor or a six-phase electric motor, and the connection fault includes an open-circuit fault and a short-circuit fault.

In order to avoid the misjudge of occurring the connection fault of the electric motor due to noise interference, it is not immediately to determine that the connection fault occurs even if the frequency difference between the frequency of the angular velocity and the frequency of the output voltage of the inverter is greater than 5 Hz (i.e., the predetermined frequency difference value). Furthermore, it is to determine whether the condition (i.e., the frequency difference is greater than the predetermined frequency difference value) continuously occurs, i.e., exceeds a predetermined time, for example but not limited to, 4 milliseconds. In other words, if the frequency difference between the frequency of the angular velocity and the frequency of the output voltage of the inverter is greater than the predetermined frequency difference value, and the condition of excessive frequency difference continuously lasts for more than the predetermined time, it is to determine that the connection fault of the electric motor occurs. On the contrary, if the frequency difference between the frequency of the angular velocity and the frequency of the output voltage of the inverter is greater than the predetermined frequency difference value for a while, but the condition of excessive frequency difference does not continuously last for more than the predetermined time, it is to determine that the connection fault of the electric motor does not occur. Accordingly, the additional time determination mechanism is used to avoid the misjudge of occurring the connection fault of the electric motor due to the instantaneous (transient) excessive frequency difference caused by the noise interference. In particular, the electric motor may be a three-phase electric motor or a six-phase electric motor, and the connection fault includes an open-circuit fault and a short-circuit fault.

Figure 5:
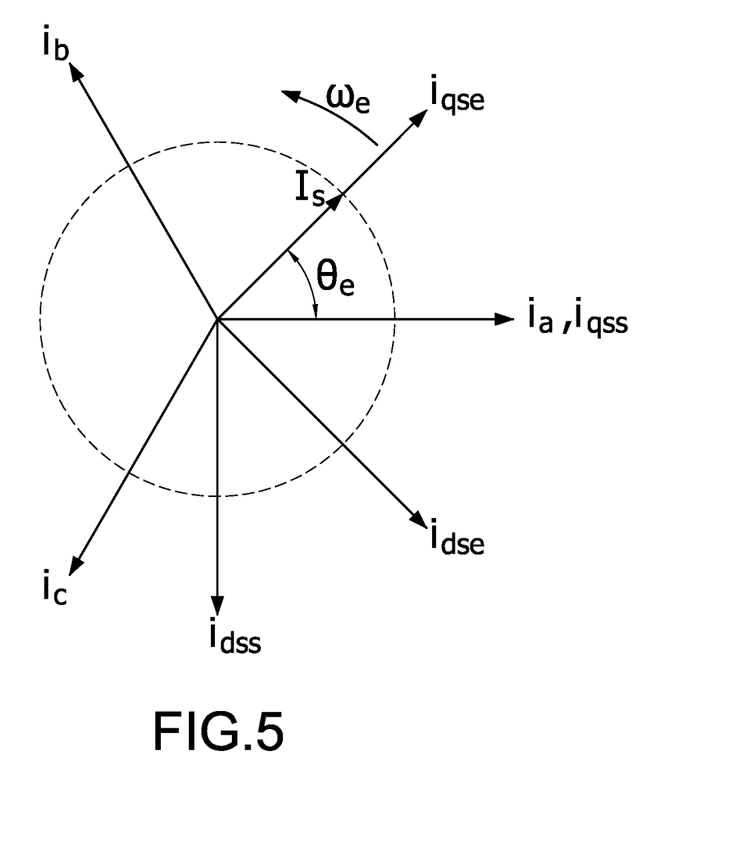
FIG. 5 is a schematic diagram of a three-phase current in a stationary coordinate and in a synchronous coordinate according to the present disclosure.
Figure 6:
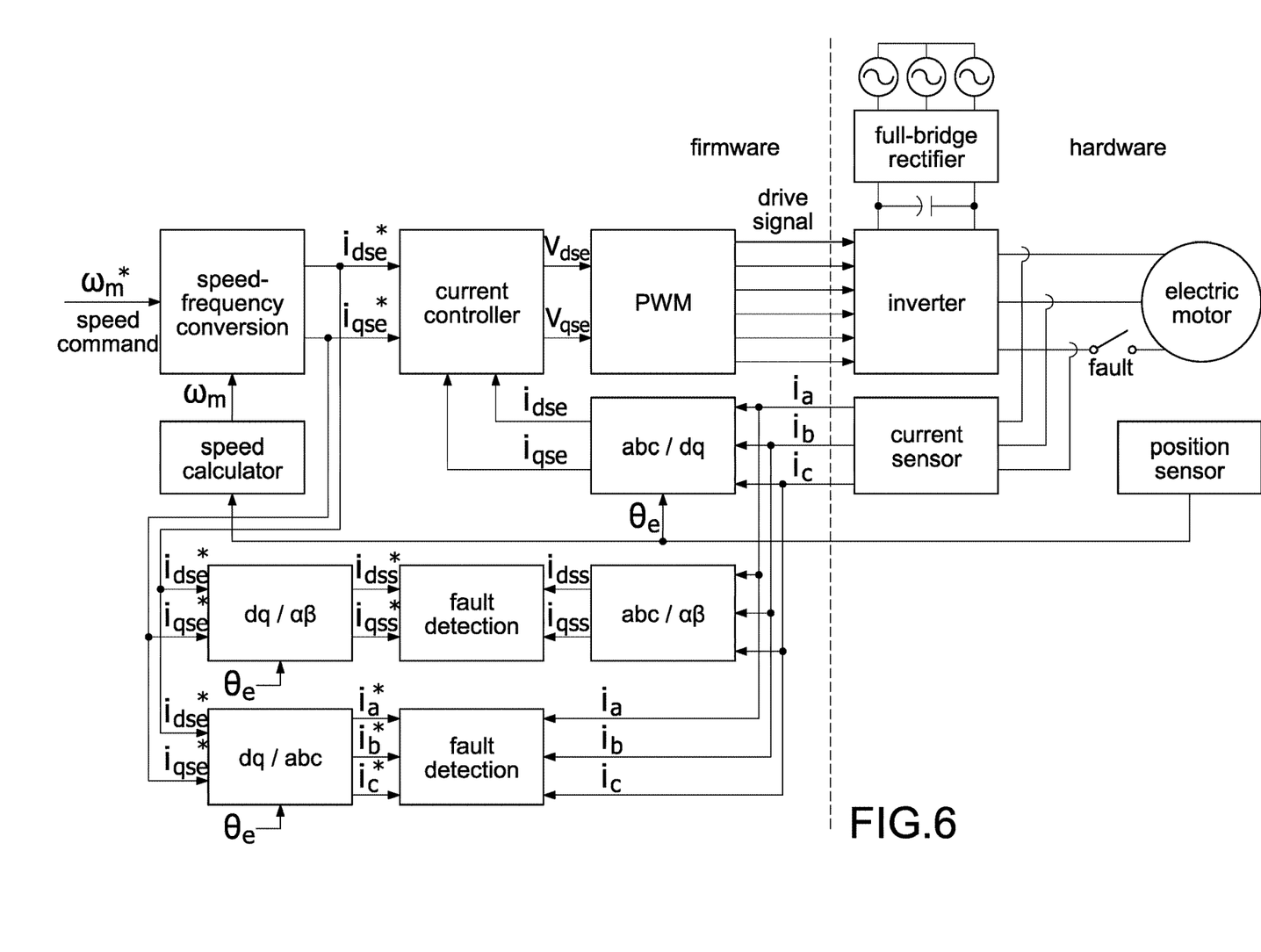
FIG. 6 is a schematic block diagram of connection fault detection of the electric motor according to a second embodiment of the present disclosure.

Please refer to FIG. 5, which shows a schematic diagram of a three-phase current in a stationary coordinate and in a synchronous coordinate according to the present disclosure. The method of detecting connection fault of the electric motor is applied to a closed-loop driving mechanism. In particular, the connection fault may include an open-circuit fault or a short-circuit fault. Please refer to FIG. 6, which shows a schematic block diagram of connection fault detection of the electric motor according to a second embodiment of the present disclosure. Please refer to FIG. 7, which shows a flowchart of a method of detecting connection fault of the electric motor according to a second embodiment of the present disclosure. The following takes the method of FIG. 7 as the main description, and the method is applied to a closed-loop driving mechanism. First, a three-phase stator current ($i_a$, $i_b$, $i_c$) of an electric motor is measured (S21). In one embodiment, the detection of the open-circuit fault of the three-phase electric motor is used as an example, but it can also be applied to a six-phase electric motor, and it can also be applied to the detection of the short-circuit fault. Afterward, the three-phase stator current is transformed to acquire dual-axis current components or three-axis current components in a stationary coordinate (S22). In particular, the stationary coordinate is also called $\alpha/\beta$ (alpha/beta) coordinate ($i_{qss}$ and $i_{dss}$ are represented as current components). By transformation, the three-phase stator current ($i_a$, $i_b$, $i_c$) can be transformed to the dual-axis current components in the $\alpha/\beta$ coordinate. Also, the three-phase stator current ($i_a$, $i_b$, $i_c$) can be directly used to acquire the three current values in the stationary coordinate. That is, a relationship between the stationary coordinate and a scalar stator current is as follows:

$$\begin{bmatrix} i_{qss} \\ i_{dss} \end{bmatrix} = \frac{2}{3} \begin{bmatrix} 1 & -\frac{1}{2} & -\frac{1}{2} \\ 0 & -\frac{\sqrt{3}}{2} & \frac{\sqrt{3}}{2} \end{bmatrix} \begin{bmatrix} i_a \\ i_b \\ i_c \end{bmatrix} \quad (4)$$

Through relational equation (4), therefore, the three-phase stator current ($i_a$, $i_b$, $i_c$) is transformed to acquire dual-axis current components ($i_{qss}$, $i_{dss}$) in the stationary coordinate. In particular, the axis current command in the synchronous coordinate and the stator current shown in FIG. 6 can be differentiated according to different embodiments for multi-axis transformation. For example, they are respectively transformed to dual-axis current commands or three-axis current commands in the stationary coordinate and dual-axis current components or three-axis current components in the stationary coordinate, and then the multi-axis current commands and the multi-axis current components are compared to achieve the purpose of the detection of connection fault. In particular, the three-phase stator current ($i_a$, $i_b$, $i_c$) can be directly used as the three-axis current components in the stationary coordinate to simplify and speed up calculations.

Figure 7:
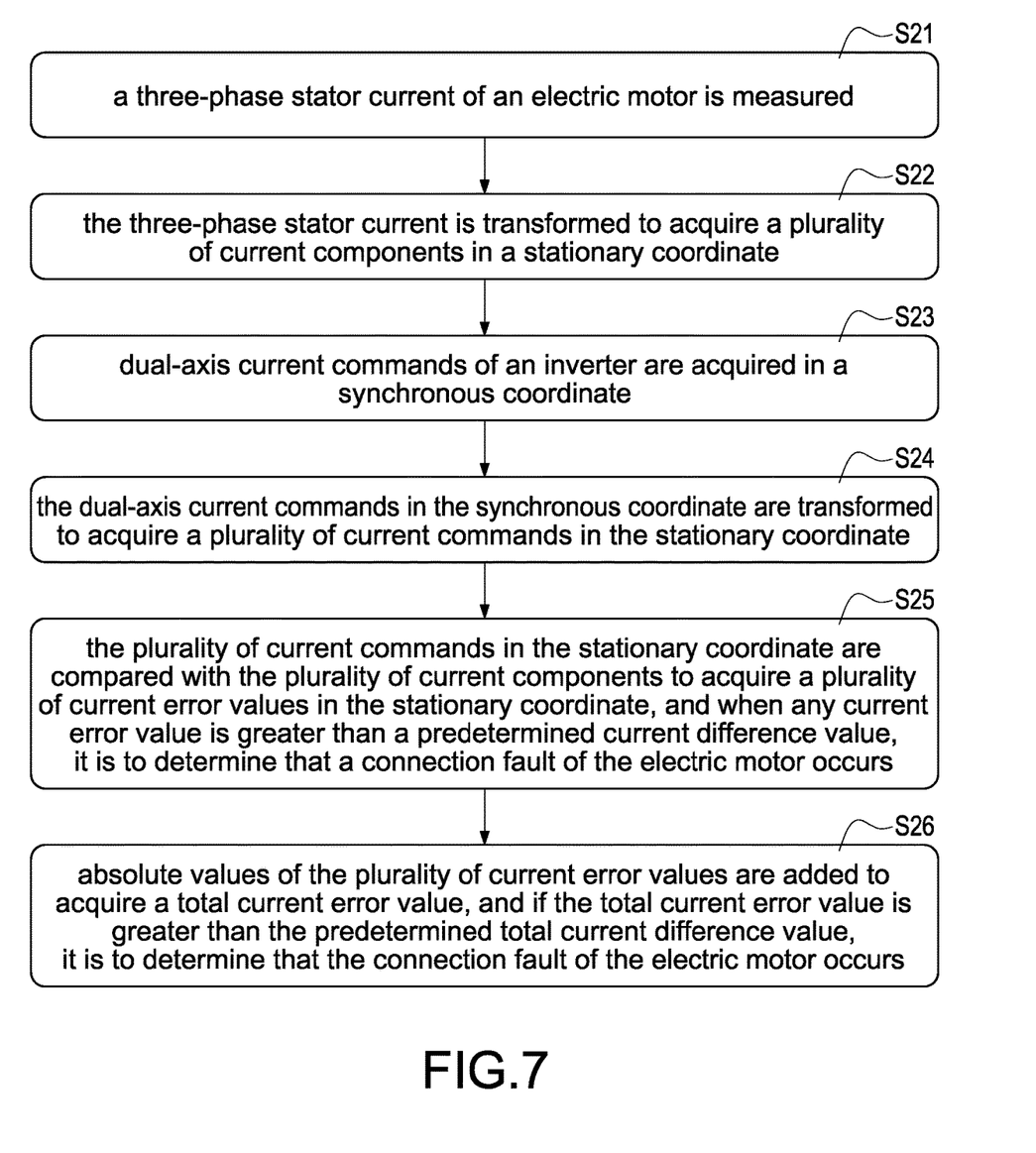
FIG. 7 is a flowchart of a method of detecting connection fault of the electric motor according to a second embodiment of the present disclosure.

Afterward, dual-axis current commands of the inverter are acquired in a synchronous coordinate (S23). In particular, the synchronous coordinate is a d-q axis rotation coordinate. The dual-axis current commands include a d-axis current command ($i_{qse}*$) and a q-axis current command ($i_{dse}*$).

Afterward, the dual-axis current commands in the synchronous coordinate are transformed to acquire dual-axis current commands or three-axis current commands in the stationary coordinate (S24). In particular, the step (S24) can be implemented through relational equations (5a) and (5b) as follows.

$$\begin{bmatrix} i_{qss}^* \\ i_{dss}^* \end{bmatrix} = \begin{bmatrix} \cos\theta_e & \sin\theta_e \\ -\sin\theta_e & \cos\theta_e \end{bmatrix} \begin{bmatrix} i_{qse}^* \\ i_{dse}^* \end{bmatrix} \quad (5a)$$

$$\begin{bmatrix} i_a^* \\ i_b^* \\ i_c^* \end{bmatrix} = \begin{bmatrix} \cos\theta_e & \sin\theta_e \\ \cos\left(\theta_e - \frac{2\pi}{3}\right) & \sin\left(\theta_e - \frac{2\pi}{3}\right) \\ \cos\left(\theta_e + \frac{2\pi}{3}\right) & \sin\left(\theta_e + \frac{2\pi}{3}\right) \end{bmatrix} \begin{bmatrix} i_{qse}^* \\ i_{dse}^* \end{bmatrix} \quad (5b)$$

Through relational equations (5a) and (5b), therefore, the dual-axis current commands ($i_{qse}^*$, $i_{dse}^*$) in the synchronous coordinate are transformed to acquire dual-axis current commands ($i_{qss}^*$, $i_{dss}^*$) or three-axis current commands ($i_a$, $i_b$, $i_c$) in the stationary coordinate.

Afterward, in one embodiment, dual-axis current commands in the stationary coordinate are compared with dual-axis current components in the stationary coordinate to acquire dual-axis current error values in the stationary coordinate. Alternatively, in another embodiment, three-axis current commands in the stationary coordinate are compared with three-axis current components (i.e., the three-phase stator current) in the stationary coordinate to acquire three-axis current error values in the stationary coordinate. As long as any of the plurality of axis current error values is greater than a predetermined current difference value, it is to determine that the connection fault of the electric motor occurs (S25). Further, absolute values of the dual-axis current error values or absolute values of the three-axis current error values are calculated, and then the absolute values are added to acquire a total current error value in the stationary coordinate.

Finally, the total current error value is compared with a predetermined total current difference value to determine whether the connection fault of the electric motor occurs. That is, if the total current error value is greater than the predetermined total current difference value, it is to determine that the connection fault of the electric motor occurs (S26). Take the dual-axis current components transformed in the stationary coordinate as an example. For example, a qss-axis current error value ($i_{qerr}$) can be acquired by subtracting a qss-axis current component ($i_{qss}$) from a qss-axis current command ($i_{qss}^*$) in the stationary coordinate, that is, $i_{qerr}=i_{qss}^*-i_{qss}$. Similarly, a dss-axis current error value ($i_{derr}$) can be acquired by subtracting a dss-axis current component ($i_{dss}$) from a dss-axis current command ($i_{dss}^*$) in the stationary coordinate, that is, $i_{derr}=i_{dss}^*-i_{dss}$. Afterward, the absolute value of the qss-axis current error value is added to the absolute value of the d-axis current error value to acquire the total current error value. The above-mentioned qss-axis current error value ($i_{qerr}$), the dss-axis current error value ($i_{derr}$), or the total current error value can be used to determine whether the connection fault of the electric motor occurs or not. As for the three-axis comparison manner is similar, and the predetermined current difference value or the predetermined total current difference value can be separately or collectively set according to actual requirements, and the present disclosure is not limited to this.

Take the dual-axis current components transformed in the stationary coordinate as an example. When the electric motor normally operates (i.e., no open-circuit fault or short-circuit fault occurs), the current values ($i_{qss}$, $i_{dss}$) in the stationary coordinate should be close to the dual-axis current commands ($i_{qss}^*$, $i_{dss}^*$) in the stationary coordinate transformed from the dual-axis current commands ($i_{qse}^*$, $i_{dse}^*$) in the synchronous coordinate, that is, the current values ($i_{qss}$, $i_{dss}$) in the stationary will follow the dual-axis current commands ($i_{qss}^*$, $i_{dss}^*$) in the stationary coordinate for adjustment. Specifically, the output voltage is adjusted and changed so that that the actual currents are consistent with the dual-axis current commands. Therefore, the dual-axis current error values are compared with the predetermined current difference value to determine whether the current values in the stationary coordinate can follow the dual-axis current commands in the stationary coordinate so as to determine whether the connection fault of the electric motor occurs or not. That is, if the dual-axis current error values exceed the predetermined current difference value, it can be confirmed that the current values cannot follow the dual-axis current commands, and therefore it is to determine that the connection fault of the electric motor occurs. In one embodiment, the predetermined current difference value is, for example but not limited to, 2% of a rated output current of the inverter. Once the dss-axis current error value or the qss-axis current error value is too large and exceeds the predetermined current difference value, or the multi-axis total current error value is too large and exceeds the multi-axis predetermined total current difference value, for example but not limited to, the total current error value exceeds 3.5% of the rated output current of the inverter, it is to determine that the connection fault of the electric motor occurs. On the contrary, if both the dss-axis current error value and the qss-axis current error value are less than or equal to the predetermined current difference value, or the multi-axis total current error value is less than or equal to the multi-axis predetermined total current difference value, it is to determine that the connection fault of the electric motor does not occur. In other words, when the electric motor normally operates (i.e., no open-circuit fault or short-circuit fault occurs), the current values ($i_{qss}$, $i_{dss}$) in the stationary coordinate should be close to or even the same as the dual-axis current commands ($i_{qss}^*$, $i_{dss}^*$) in the stationary coordinate transformed from the dual-axis current commands ($i_{qse}^*$, $i_{dse}^*$) in the synchronous coordinate. Therefore, the connection fault of the electric motor can be confirmed by determining the d-axis current error value or the q-axis current error value is too large, or determining the total current error value is too large. Moreover, regardless of whether the electric motor operates in an acceleration state or in a steady state, since the response of following the dual-axis current command ($i_{qss}^*$, $i_{dss}^*$) in the stationary coordinate by the current value ($i_{qss}$, $i_{dss}$) in the stationary coordinate is fast, the information of the dual-axis current error value can be used to quickly detect whether the connection fault of the electric motor occurs or not. In particular, the electric motor may be a three-phase electric motor or a six-phase electric motor, the connection fault includes an open-circuit fault and a short-circuit fault, and dual-axis or three-axis current comparison can be implemented.

In order to avoid the misjudge of occurring the connection fault of the electric motor due to noise interference, it is not immediately to determine that the connection fault occurs even if the d-axis current error value or the q-axis current error value is greater than 2% of the rated output current of the inverter, or the total current error value is greater than 3.5% of the rated output current of the inverter. Furthermore, it is to determine whether the condition (i.e., the axis current error value is greater than the predetermined current difference value, or the total current error value is greater than the predetermined total current difference value) continuously occurs, i.e., exceeds a predetermined time, for example but not limited to, 4 milliseconds. In other words, if the d-axis current error value or the q-axis current error value is greater than the predetermined current difference value, or the total current error value is greater than the predetermined total current difference value, and the condition of excessive axis current error value continuously lasts for more than the predetermined time, it is to determine that the connection fault of the electric motor occurs. On the contrary, if the d-axis current error value or the q-axis current error value is greater than the predetermined current difference value, or the total current error value is greater than the predetermined total current difference value, but the condition of excessive axis current error value does not continuously last for more than the predetermined time, it is to determine that the connection fault of the electric motor does not occur. Accordingly, the additional time determination mechanism is used to avoid the misjudge of occurring the connection fault of the electric motor due to the instantaneous (transient) excessive axis current error value caused by the noise interference. In particular, the electric motor may be a three-phase electric motor or a six-phase electric motor, the connection fault includes an open-circuit fault and a short-circuit fault, and dual-axis or three-axis current comparison can be implemented.

In conclusion, the present disclosure has following features and advantages:

1. The application scope of the connection fault detection of the electric motor can widely cover the existing control or driving methods based on the inverter drive architecture, such as V/f control, V/f-PG control, SVC control, FOC-PG control, FOC-PGPM control, and so on. Also, the connection fault detection of the electric motor can be used for both the open-loop drive mechanism and the closed-loop drive mechanism. The connection fault detection can be applied to multi-phase electric motor including the three-phase electric motor and six-phase electric motor. Furthermore, the connection fault detection can include open-circuit fault detection and short-circuit fault detection.

2. In comparison with the method of measuring the signal response by exciting the current signal at different angles, the present disclosure does not be required to receive additional signals and measure the current response, and parameters of the electric motor have less influence, and therefore the operation is simpler, faster and more accurate.

3. In comparison with the control method of determining that the negative sequence voltage is higher than the threshold value, the present disclosure directly uses the current for determination, which can ensure that the connection fault can still be immediately detected when the current is abnormal.

4. In comparison with the method of detecting negative sequence voltage, three-phase voltage RMS error, total harmonic distortion, and so on, the present disclosure does not require a complete sampling cycle and can detect the connection fault in a short time when the connection fault occurs.

Accordingly, the method of detecting the connection fault of the electric motor can immediately detect the open-circuit fault or the short-circuit fault so as to avoid the loss of life and property and system damage caused by the continuous operation of the electric motor if the open-circuit fault or the short-circuit fault occurs.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of detecting a connection fault of an electric motor applied to an open-loop driving mechanism of an inverter, the method comprising:
   measuring a three-phase stator current of the electric motor;
   transforming the three-phase stator current to acquire dual-axis current components in a stationary coordinate;
   calculating an angle of rotation of the electric motor according to the dual-axis current components;
   calculating an angular velocity according to the angle of rotation;
   comparing a frequency of the angular velocity with a frequency of an output voltage of the inverter; and
   determining that the electric motor occurs a connection fault if a difference between the frequency of the angular velocity and the frequency of the output voltage is greater than a predetermined frequency difference value.

2. The method of detecting the connection fault of the electric motor as claimed in claim 1, wherein the electric motor is determined to occur the connection fault if the difference between the frequency of the angular velocity and the frequency of the output voltage is greater than the predetermined frequency difference value and the condition lasts for more than a predetermined time.

3. The method of detecting the connection fault of the electric motor as claimed in claim 1, wherein the predetermined frequency difference value is 5 Hz.

4. A method of detecting a connection fault of an electric motor applied to a closed-loop driving mechanism of an inverter, the method comprising:
   measuring a three-phase stator current of the electric motor;
   transforming the three-phase stator current to acquire a plurality of axis current components in a stationary coordinate;
   acquiring dual-axis current commands of the inverter in a synchronous coordinate;
   transforming the dual-axis current commands to acquire a plurality of axis current commands of the inverter in the stationary coordinate; and
   comparing the plurality of axis current commands in the stationary coordinate and the plurality of axis current components in the stationary coordinate to acquire a plurality of axis current error values in the stationary coordinate, and determining that the electric motor occurs a connection fault if any of the plurality of axis current error values is greater than a predetermined current difference value.

5. The method of detecting the connection fault of the electric motor as claimed in claim 4, wherein the plurality of axis current commands are dual-axis current commands or three-axis current commands, the plurality of axis current components are dual-axis current components or the three-phase stator current, and the plurality of axis current error values are dual-axis current error values or three-axis current error values.

6. The method of detecting the connection fault of the electric motor as claimed in claim 5, further comprising:
   calculating absolute values of the dual-axis current error values or absolute values of the three-axis current error values, and adding the absolute values to acquire a total current error value, and
   determining that the electric motor occurs the connection fault if the total current error value is greater than a predetermined total current difference value.

7. The method of detecting the connection fault of the electric motor as claimed in claim 6, wherein the predetermined total current difference value is 3.5% of a rated output current of the inverter.

8. The method of detecting the connection fault of the electric motor as claimed in claim 6, wherein the electric motor is determined to occur the connection fault if the total current error value is greater than the predetermined total current difference value and the condition lasts for more than a predetermined time.

9. The method of detecting the connection fault of the electric motor as claimed in claim 4, wherein the predetermined current difference value is 2% of a rated output current of the inverter.

10. The method of detecting the connection fault of the electric motor as claimed in claim 4, wherein the electric motor is determined to occur the connection fault if any of the plurality of axis current error values is greater than the predetermined current difference value and the condition lasts for more than a predetermined time.

* * * * *